United States Patent
Morrise et al.

(10) Patent No.: US 12,542,212 B2
(45) Date of Patent: Feb. 3, 2026

(54) ICE ULTRASOUND REMOTE CONTROL

(71) Applicant: yoR Labs, Inc., Beaverton, OR (US)

(72) Inventors: Matthew C. Morrise, Portland, OR (US); Dan Oliver, Beaverton, OR (US)

(73) Assignee: yoR Labs, Inc., Beaverton, OR (US)

( * ) Notice: Subject to any disclaimer, the term of this patent is extended or adjusted under 35 U.S.C. 154(b) by 190 days.

(21) Appl. No.: 18/429,935

(22) Filed: Feb. 1, 2024

(65) Prior Publication Data
US 2024/0266045 A1 Aug. 8, 2024

Related U.S. Application Data

(60) Provisional application No. 63/482,848, filed on Feb. 2, 2023.

(51) Int. Cl.
*G06F 3/04847* (2022.01)
*A61B 8/00* (2006.01)
(Continued)

(52) U.S. Cl.
CPC ............... *G16H 40/67* (2018.01); *A61B 8/54* (2013.01); *G06F 3/04847* (2013.01); *G06F 3/04883* (2013.01); *G06F 3/1454* (2013.01)

(58) Field of Classification Search
None
See application file for complete search history.

(56) References Cited

U.S. PATENT DOCUMENTS

| | | |
|---|---|---|
| 4,998,132 A | 3/1991 | Kurogane |
| 5,364,351 A | 11/1994 | Heinzelman et al. |
| | (Continued) | |

FOREIGN PATENT DOCUMENTS

| | | |
|---|---|---|
| AU | 2018250516 | 11/2018 |
| EP | 2 288 284 | 5/2016 |
| | (Continued) | |

OTHER PUBLICATIONS

Bradley, Aug. 2008, Retrospective transmit beamformation: Acuson SC2000 volume imaging ultrasound system, Siemens Medical Solutions USA, Inc., whitepaper, 8 pp.
(Continued)

*Primary Examiner* — Tuan S Nguyen
(74) *Attorney, Agent, or Firm* — KNOBBE, MARTENS, OLSON & BEAR, LLP

(57) ABSTRACT

Methods and systems for remotely controlling an ICE ultrasound system are described. In an example, a method can include displaying a GUI on a screen of a remote control device coupled to an ICE ultrasonic handheld device containing a real-time ultrasonic image, mirroring the GUI on a separate display monitor, receiving a first touch input and displaying a remote control interactive menu overlaid on the ultrasonic image, wherein the first touch input corresponds to a selection of a control of a parameter, receiving a second touch input on the screen and displaying the remote control interactive menu, wherein the second touch input corresponds to an adjustment of the selected parameter, updating the ultrasonic image on the remote control device and display monitor according to the selected and adjusted remote control parameter, wherein the system comprises a computer processor and an electronic storage medium.

20 Claims, 6 Drawing Sheets

(51) Int. Cl.
    *G06F 3/04883*    (2022.01)
    *G06F 3/14*    (2006.01)
    *G16H 40/67*    (2018.01)

(56)    References Cited

U.S. PATENT DOCUMENTS

| | | |
|---|---|---|
| 5,617,371 A | 4/1997 | Williams |
| 5,903,516 A | 5/1999 | Greenleaf et al. |
| 5,908,389 A | 6/1999 | Roundhill et al. |
| 6,031,529 A | 2/2000 | Migos |
| 6,063,030 A | 5/2000 | Vara et al. |
| 6,120,450 A | 9/2000 | Li |
| 6,123,670 A | 9/2000 | Mo |
| 6,132,374 A | 10/2000 | Hossack et al. |
| 6,400,981 B1 | 6/2002 | Govari |
| 6,607,489 B2 | 8/2003 | Hoctor |
| 6,690,963 B2 | 2/2004 | Ben Haim et al. |
| 6,908,434 B1 | 6/2005 | Jenkins et al. |
| 7,090,639 B2 | 8/2006 | Govari |
| 7,423,578 B1 | 9/2008 | Tietjen |
| 7,604,601 B2 | 10/2009 | Altmann et al. |
| 7,648,462 B2 | 1/2010 | Jenkins et al. |
| 7,667,639 B2 | 2/2010 | Cheng et al. |
| 7,682,358 B2 | 3/2010 | Gullickson et al. |
| 7,750,849 B2 | 7/2010 | Hjelmstad |
| 7,831,076 B2 | 11/2010 | Altmann et al. |
| 7,860,553 B2 | 12/2010 | Govari et al. |
| 7,918,793 B2 | 4/2011 | Altmann et al. |
| 7,930,721 B1* | 4/2011 | Hernes ............ H04N 21/47815 |
| | | 725/78 |
| 7,996,060 B2 | 8/2011 | Trofimov et al. |
| 8,075,486 B2 | 12/2011 | Tal |
| 8,285,364 B2 | 10/2012 | Barbagli et al. |
| 8,390,438 B2 | 3/2013 | Olson et al. |
| 8,449,467 B2 | 5/2013 | Wilser et al. |
| 8,517,946 B2 | 8/2013 | Kim |
| 8,676,290 B2 | 3/2014 | Tegg |
| 8,690,871 B2 | 4/2014 | Partlett et al. |
| 8,702,612 B2 | 4/2014 | Hendriks et al. |
| 8,989,842 B2 | 3/2015 | Li et al. |
| 9,030,354 B2 | 5/2015 | Natarajan |
| 9,055,883 B2 | 6/2015 | Tgavalekos et al. |
| 9,075,523 B2* | 7/2015 | Stallings .......... H04N 21/42224 |
| 9,095,682 B2 | 8/2015 | Romoscanu |
| 9,132,913 B1 | 9/2015 | Shapiro et al. |
| 9,179,890 B2 | 11/2015 | Ionasec et al. |
| 9,211,160 B2 | 12/2015 | Pivotto et al. |
| 9,261,595 B2 | 2/2016 | Garbini et al. |
| 9,323,445 B2 | 4/2016 | Kritt et al. |
| 9,342,156 B2 | 5/2016 | Huh |
| 9,922,554 B2 | 3/2018 | Mikuni et al. |
| 9,931,487 B2 | 4/2018 | Quinn et al. |
| 9,986,969 B2 | 6/2018 | Call et al. |
| 10,183,149 B2 | 1/2019 | Tegg et al. |
| 10,206,652 B2 | 2/2019 | Deno et al. |
| 10,368,951 B2 | 8/2019 | Moll et al. |
| 10,401,492 B2 | 9/2019 | Brooks |
| 10,405,830 B2 | 9/2019 | Garbini et al. |
| 10,463,439 B2 | 11/2019 | Joseph et al. |
| 10,499,882 B2 | 12/2019 | Hunter et al. |
| 10,537,307 B2 | 1/2020 | Yang |
| 10,555,780 B2 | 2/2020 | Tanner et al. |
| 10,624,612 B2 | 4/2020 | Sumi |
| 11,255,964 B2 | 2/2022 | Brooks |
| 11,344,281 B2 | 5/2022 | Morisse et al. |
| 11,547,386 B1 | 1/2023 | Roy et al. |
| 11,704,142 B2 | 7/2023 | Morisse |
| 11,751,850 B2 | 9/2023 | Morisse |
| 11,832,991 B2 | 12/2023 | Morisse |
| 11,892,542 B1 | 2/2024 | Brooks |
| 2002/0173721 A1 | 11/2002 | Grunwald |
| 2002/0173722 A1 | 11/2002 | Hoctor et al. |
| 2003/0007598 A1 | 1/2003 | Wang et al. |
| 2003/0055334 A1 | 3/2003 | Steinbacher et al. |
| 2003/0055337 A1 | 3/2003 | Lin |
| 2004/0102700 A1 | 5/2004 | Asafusa |
| 2005/0288588 A1 | 12/2005 | Weber et al. |
| 2007/0027733 A1 | 2/2007 | Balle |
| 2007/0064140 A1* | 3/2007 | Kitaura ................. G06F 3/0304 |
| | | 348/333.01 |
| 2007/0174772 A1 | 7/2007 | Gorman |
| 2007/0200760 A1 | 8/2007 | Hjelmstad |
| 2007/0239001 A1 | 10/2007 | Mehi et al. |
| 2007/0259158 A1 | 11/2007 | Friedman et al. |
| 2008/0012753 A1 | 1/2008 | Cheng |
| 2008/0114239 A1 | 5/2008 | Randall et al. |
| 2008/0146940 A1 | 6/2008 | Jenkins et al. |
| 2008/0215046 A1 | 9/2008 | Messing et al. |
| 2008/0306385 A1 | 12/2008 | Jago |
| 2009/0043206 A1 | 2/2009 | Towfiq et al. |
| 2009/0118620 A1 | 5/2009 | Tgavalekos et al. |
| 2009/0171275 A1 | 7/2009 | Ostrovsky et al. |
| 2009/0250729 A1 | 10/2009 | Lemmerhirt |
| 2009/0271704 A1 | 10/2009 | Cohen |
| 2010/0030076 A1 | 2/2010 | Vortman et al. |
| 2010/0081938 A1 | 4/2010 | Kato |
| 2010/0146431 A1 | 6/2010 | Raji et al. |
| 2010/0160784 A1 | 6/2010 | Poland |
| 2010/0168580 A1 | 7/2010 | Thiele |
| 2010/0234831 A1 | 9/2010 | Hinman et al. |
| 2010/0251823 A1 | 10/2010 | Adachi |
| 2011/0077524 A1 | 3/2011 | Oshiki et al. |
| 2011/0137132 A1 | 6/2011 | Gustafson |
| 2011/0208052 A1 | 8/2011 | Entrekin |
| 2012/0075208 A1 | 3/2012 | Tamiya et al. |
| 2012/0157851 A1 | 6/2012 | Zwirn |
| 2012/0254747 A1 | 10/2012 | Bocirnea |
| 2012/0274863 A1* | 11/2012 | Chardon ................. G06F 16/65 |
| | | 348/734 |
| 2013/0015975 A1 | 1/2013 | Huennekens et al. |
| 2013/0120296 A1 | 5/2013 | Merritt et al. |
| 2013/0227052 A1 | 8/2013 | Wenzel |
| 2013/0234891 A1 | 9/2013 | Natarajan et al. |
| 2013/0238990 A1 | 9/2013 | Ubillos et al. |
| 2013/0253317 A1 | 9/2013 | Gauthier |
| 2013/0274712 A1 | 10/2013 | Schecter et al. |
| 2013/0310690 A1 | 11/2013 | Chang |
| 2014/0035916 A1 | 2/2014 | Murphy |
| 2014/0046188 A1 | 2/2014 | Yen et al. |
| 2014/0058266 A1 | 2/2014 | Call et al. |
| 2014/0087342 A1 | 3/2014 | Campanatti, Jr. |
| 2014/0164965 A1 | 6/2014 | Lee et al. |
| 2014/0189560 A1 | 7/2014 | Caspi |
| 2014/0219059 A1 | 8/2014 | Younghouse |
| 2014/0336573 A1 | 11/2014 | Yu et al. |
| 2015/0019488 A1 | 1/2015 | Higginson et al. |
| 2015/0065877 A1 | 3/2015 | Orderud |
| 2015/0082251 A1 | 3/2015 | Lam |
| 2015/0293223 A1 | 10/2015 | Park et al. |
| 2016/0054901 A1 | 2/2016 | Yang et al. |
| 2016/0095650 A1 | 4/2016 | Greifenender et al. |
| 2016/0157824 A1 | 6/2016 | Park et al. |
| 2016/0161589 A1 | 6/2016 | Benattar |
| 2016/0161594 A1 | 6/2016 | Benattar |
| 2016/0161595 A1 | 6/2016 | Benattar |
| 2016/0165338 A1 | 6/2016 | Benattar |
| 2016/0165341 A1 | 6/2016 | Benattar |
| 2016/0338676 A1 | 11/2016 | Berger et al. |
| 2017/0072167 A1 | 3/2017 | Weitzner et al. |
| 2017/0090571 A1 | 3/2017 | Bjaerum |
| 2017/0153801 A1 | 6/2017 | Kim et al. |
| 2017/0266413 A1 | 9/2017 | Khuu et al. |
| 2017/0307755 A1 | 10/2017 | Brooks |
| 2017/0326337 A1 | 11/2017 | Romoscanu et al. |
| 2017/0343655 A1 | 11/2017 | Solek et al. |
| 2017/0343668 A1 | 11/2017 | Brooks et al. |
| 2018/0000449 A1 | 1/2018 | Moore et al. |
| 2018/0000453 A1 | 1/2018 | Hunter et al. |
| 2018/0003811 A1 | 1/2018 | Pellegretti |
| 2018/0055483 A1 | 3/2018 | Hunter |
| 2018/0064415 A1 | 3/2018 | Zhai et al. |
| 2018/0361145 A1 | 12/2018 | Mahapatra et al. |
| 2019/0201110 A1 | 7/2019 | Kuenen |
| 2019/0245310 A1 | 8/2019 | Medina et al. |

(56) References Cited

U.S. PATENT DOCUMENTS

| | | |
|---|---|---|
| 2019/0261953 A1 | 8/2019 | Honjo et al. |
| 2019/0307427 A1 | 10/2019 | Levy et al. |
| 2019/0353975 A1 | 11/2019 | DiDomenico |
| 2020/0000430 A1 | 1/2020 | Chamberlain |
| 2020/0046321 A1 | 2/2020 | Duda |
| 2020/0060646 A1 | 2/2020 | Lindenroth et al. |
| 2020/0170662 A1 | 6/2020 | Vardi |
| 2020/0178928 A1 | 6/2020 | Park et al. |
| 2020/0183004 A1 | 6/2020 | Gong et al. |
| 2020/0205783 A1 | 7/2020 | Shiran |
| 2020/0268351 A1 | 8/2020 | Chiang |
| 2020/0281565 A1 | 9/2020 | Yee et al. |
| 2020/0315592 A1 | 10/2020 | Soleimani et al. |
| 2020/0330076 A1 | 10/2020 | Weber |
| 2021/0007710 A1 | 1/2021 | Douglas |
| 2021/0022716 A1 | 1/2021 | Kerby |
| 2021/0030394 A1 | 2/2021 | Caswell et al. |
| 2021/0038334 A1 | 2/2021 | Hsu et al. |
| 2021/0125503 A1 | 4/2021 | Henry et al. |
| 2021/0177379 A1 | 6/2021 | Kolen et al. |
| 2021/0338208 A1 | 11/2021 | Nguyen et al. |
| 2021/0401400 A1 | 12/2021 | Sheehan et al. |
| 2021/0401508 A1 | 12/2021 | Zhao |
| 2022/0061811 A1 | 3/2022 | Terleski |
| 2022/0061906 A1 | 3/2022 | Gommeren et al. |
| 2023/0059122 A1 | 2/2023 | Pellegrino |

FOREIGN PATENT DOCUMENTS

| | | |
|---|---|---|
| EP | 3 275 478 | 1/2018 |
| EP | 2 707 076 | 11/2018 |
| EP | 3 050 214 | 3/2019 |
| EP | 2 632 318 | 11/2019 |
| EP | 3 518 777 | 3/2021 |
| WO | WO 02/13682 | 2/2002 |
| WO | WO 09/079695 | 7/2009 |
| WO | WO 12/088535 | 6/2012 |
| WO | WO 17/185097 | 10/2017 |
| WO | WO 20/049012 | 3/2020 |
| WO | WO 20/252416 | 12/2020 |

OTHER PUBLICATIONS

Lin et al., Jun. 2010, A motion compounding technique for speckle reduction in ultrasound images, Journal of digital imaging 23(3):246-257.

Pandian et al., Jun. 18, 1992, Intravascular ultrasound and intracardiac echocardiography: concepts for the future, American Journal of Cardiology, 69(20):H6-H17.

* cited by examiner

ICE ULTRASOUND REMOTE CONTROL

PRIORITY AND RELATED APPLICATIONS

This application claims the benefit of U.S. Provisional Application No. 63/482,848 filed on Feb. 2, 2023. The above-listed disclosure is incorporated herein by reference in its entirety. Any and all applications for which a foreign or domestic priority claim is identified in the Application Data Sheet as filed with the present application are hereby incorporated by reference under 37 CFR 1.57.

TECHNICAL FIELD

The present application relates to catheter medical systems. Specifically, the present application relates to remote controlled intracardiac echocardiography catheter systems.

BACKGROUND

Intracardiac echocardiography (ICE) catheter systems, including all of the associated equipment for displaying a processing ICE images, can be implemented in multiple large equipment housings connected with a plurality of cables. Often ICE catheter systems are used in a hospital room (e.g., a catheterization lab or "cath lab") having limited space and a multitude of medical personnel within the room. Simultaneous handling of an ICE catheter and control of its output image during a procedure may be difficult for a single medical practitioner. It would be advantageous to provide a remote ICE ultrasound system in which imaging parameters may be controlled by simplistic touch inputs on a remote control device.

SUMMARY

Certain aspects of this invention are defined by the independent claims. The dependent claims concern optional features of some embodiments of the invention. The systems, methods, and devices described herein each have several aspects, no single one of which is solely responsible for its desirable attributes. Without limiting the scope of this disclosure, several non-limiting features will now be discussed briefly.

Embodiments relate to a method for remotely controlling an ICE ultrasound system, the method comprising: displaying a graphical user interface (GUI) on a screen of a remote control device coupled to an ICE ultrasonic handheld device, the GUI containing a real-time ultrasonic image; mirroring the GUI in real time on a display monitor separate from the remote control device; receiving a first touch input on the screen of the remote control device and displaying a remote control interactive menu overlaid on the ultrasonic image, wherein the first touch input corresponds to a selection of a control of a parameter, receiving a second touch input on the screen of the remote control device and displaying the remote control interactive menu, wherein the second touch input corresponds to an adjustment of the selected parameter, updating the ultrasonic image on the remote control device and display monitor according to the selected and adjusted remote control parameter, wherein the system comprises a computer processor and an electronic storage medium.

In some embodiments of the method, the remote control interface menu is divided into one side and another side. In some embodiments of the method, the one side comprises buttons corresponding to a control of the parameter. In some embodiments, the other side comprises an icon with two or more arrow heads.

In some embodiments of the method, the remote control interface menu comprises a value of the selected parameter. In some embodiments of the method, the selection of the parameter is based on a location where the first touch input loses contact with the screen.

In some embodiments of the method, the second touch input comprises dragging in a horizontal or vertical direction. In some embodiments of the method, adjustment of the parameter is based on the direction of the dragging of the second touch input. In some embodiments of the method, the method further comprises displaying a cursor corresponding to the location of the first touch input.

In some embodiments of the method, the method further comprises displaying a cursor corresponding to the location of the second touch input.

In some embodiments, the method further comprises removing the remote control interactive menu upon the touch input losing contact with the screen.

In some embodiments of the method, the parameter comprises one or more of depth level, sector angle, contrast, TGC, zoom level, pan location, mode, doppler box size, doppler box location, freeze/unfreeze, pause/play.

Embodiments relate to a system comprising: an ICE ultrasonic handheld device; a remote control device; a display monitor; a control system coupled to the remote control device and the display monitor, with a non-transitory computer storage medium configured to at least store computer-executable instructions; and one or more computer hardware processors in communication with the non-transitory computer storage medium, the one or more computer hardware processors configured to execute the computer-executable instructions to at least: display a graphical user interface (GUI) on a screen of the remote control device, the GUI containing a real-time ultrasonic image; mirror the GUI in real time on the display monitor; receive a first touch input on the screen of the remote control device and display a remote control interactive menu overlaid on the ultrasonic image, wherein the first touch input corresponds to a selection of a control of a parameter, receive a second touch input on the screen of the remote control device and display the remote control interactive menu, wherein the second touch input corresponds to an adjustment of the selected parameter, update the ultrasonic image on the remote control device and display monitor according to the selected and adjusted remote control parameter.

In some embodiments of the system, the remote control interface menu is divided into one side and another side. In some embodiments, the one side comprises buttons corresponding to a control of the parameter. In some embodiments, the other side comprises an icon with two or more arrow heads. In some embodiments, the remote control interface menu comprises a value of the selected parameter.

In some embodiments of the system, the selection of the parameter is based on a location where the first touch input loses contact with the screen.

In some embodiments of the system, the second touch input comprises dragging in a horizontal or vertical direction. In some embodiments of the system, adjustment of the parameter is based on the direction of the dragging of the second touch input.

In some embodiments of the system, the one or more hardware processors are further configured to display a cursor corresponding to the location of the first touch input. In some embodiments of the system, the one or more hardware processors are further configured to: display a cursor corresponding to the location of the second touch input.

In some embodiments of the system, the one or more hardware processors are further configured to remove the remote control interactive menu upon the touch input losing contact with the screen.

In some embodiments of the system, the parameter comprises one or more of depth level, sector angle, contrast, TGC, zoom level, pan location, mode, doppler box size, doppler box location, freeze/unfreeze, and pause/play.

Embodiments relate to a non-transitory computer readable medium configured for remotely controlling an ICE ultrasound system, the computer readable medium having program instructions for causing a hardware processor to perform a method of: displaying a graphical user interface (GUI) on a screen of a remote control device coupled to an ICE ultrasonic handheld device, the GUI containing a real-time ultrasonic image; mirroring the GUI in real time on a display monitor separate from the remote control device; receiving a first touch input on the screen of the remote control device and displaying a remote control interactive menu overlaid on the ultrasonic image, wherein the first touch input corresponds to a selection of a control of a parameter, receiving a second touch input on the screen of a remote control device and displaying the remote control interactive menu, wherein the second touch input corresponds to an adjustment of the selected parameter, updating the ultrasonic image on the remote control device and display monitor according to the selected and adjusted remote control parameter.

In some embodiments of the non-transitory computer readable medium, the remote control interface menu is divided into one side and another side. In some embodiments of the non-transitory computer readable medium, the one side comprises buttons corresponding to a control of the parameter. In some embodiments of the non-transitory computer readable medium, the other side comprises an icon with two or more arrow heads. In some embodiments of the non-transitory computer readable medium, the remote control interface menu comprises a value of the selected parameter.

In some embodiments of the non-transitory computer readable medium, the selection of the parameter is based on a location where the first touch input loses contact with the screen.

In some embodiments of the non-transitory computer readable medium, the second touch input comprises dragging in a horizontal or vertical direction. In some embodiments of the non-transitory computer readable medium, adjustment of the parameter is based on the direction of the dragging of the second touch input.

In some embodiments of the non-transitory computer readable medium, the method performed by the hardware processor further comprises displaying a cursor corresponding to the location of the first touch input. In some embodiments of the non-transitory computer readable medium, the method performed by the hardware processor further comprises displaying a cursor corresponding to the location of the second touch input.

In some embodiments of the non-transitory computer readable medium, the method performed by the hardware processor further comprises removing the remote control interactive menu upon the touch input losing contact with the screen.

In some embodiments of the non-transitory computer readable medium, the parameter comprises one or more of depth level, sector angle, contrast, TGC, zoom level, pan location, mode, doppler box size, doppler box location, freeze/unfreeze, and pause/play.

BRIEF DESCRIPTION OF THE DRAWINGS

In the drawings, which are not necessarily drawn to scale, like numerals may describe similar components in different views Like numerals having different letter suffixes may represent different instances of similar components. The drawings illustrate generally, by way of example, but not by way of limitation, various embodiments discussed in the present document.

DETAILED DESCRIPTION

Figure 1:
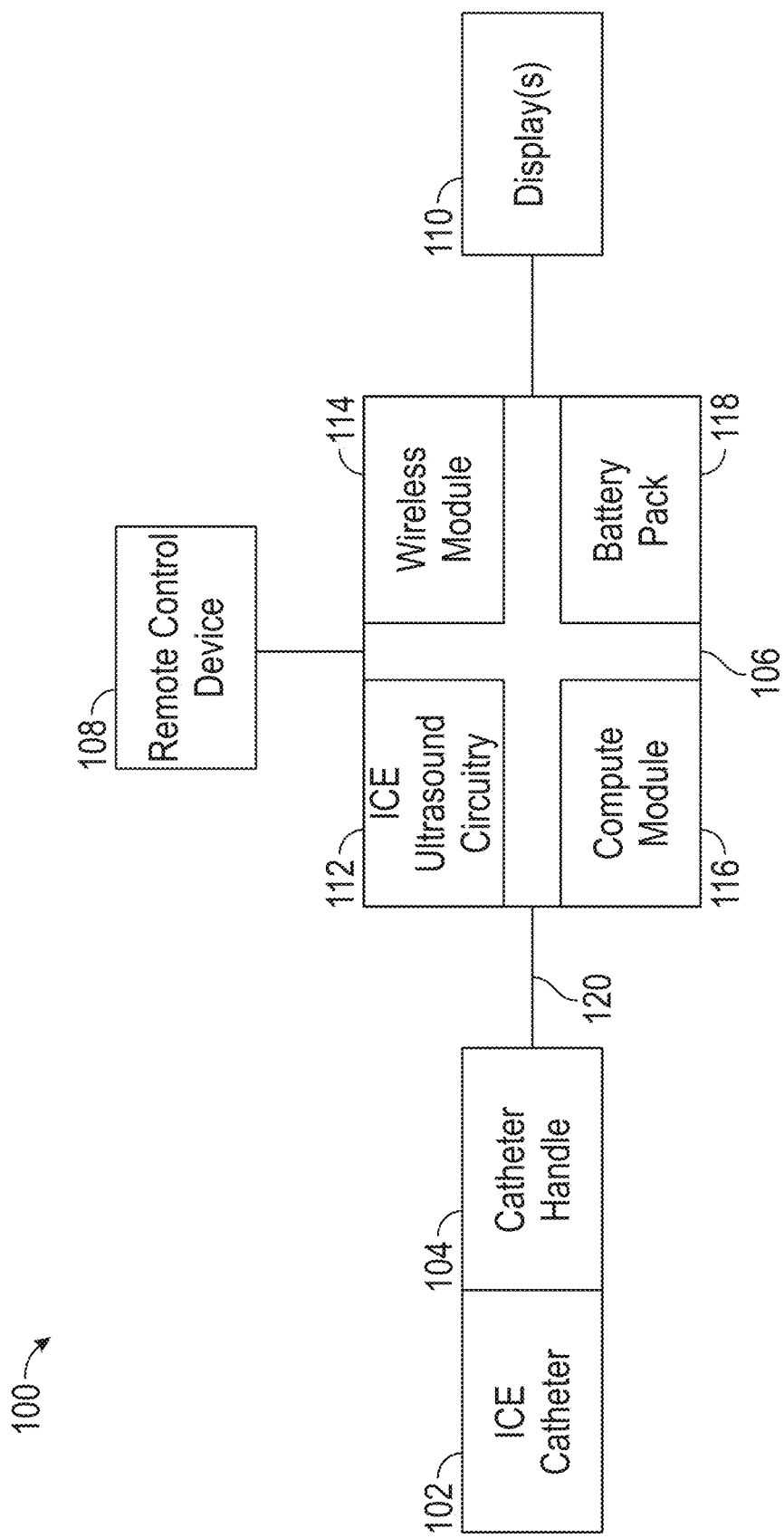
FIG. 1 is a schematic illustrating an example embodiment of an ICE ultrasound remote control system.

Ever since the invention of the modern disposable catheter in 1940s, it has enjoyed rapid growth and wide expansion in medical fields. To date, catheters have found applications in treating cardiovascular, urological, gastrointestinal, neurovascular, and ophthalmic diseases. Especially in the area of treating cardiovascular diseases there exist many catheter modalities. Among them are intracardiac echocardiography (ICE), intravascular ultrasound (IVUS), radiofrequency (RF) ablation, and fractional flow reserve (FFR). Intracardiac echocardiography (ICE) adopts a microscopic ultrasound array to realize direct imaging of anatomical cardiac structures in heart. Such imaging can provide real-time information during procedures, for example, for radiofrequency (RF) ablation procedures. RF ablation applies heat to destroy diseased tissue in order to stop pain. Intravascular ultrasound (IVUS), on the other hand, uses a microscopic ultrasonic array to generate images of a blood vessel, i.e., coronary artery. And fractional flow reserve (FFR) adopts a pressure sensor to measure pressure difference across a coronary artery stenosis to determine its effect on oxygen delivery to the heart tissue.

A catheter modality device normally may include two parts, a hardware system having electronics with software build-in to send control signals to manipulate the procedure and to acquire and process data for display and operation, and a disposable catheter which usually includes a catheter tip, a handle to operate the catheter, and an electrical connector to connect the disposable catheter to the hardware system. Generally, the hardware system is disposed on a wheeled platform so that the device can be easily moved to different places, for example, a lab, a procedure room, or a storage room. Different modalities are developed to treat different diseases. And even a single modality can have different devices developed by different companies potentially adopting different technologies for signal processing and data computing. The result is that each device typically has its own hardware system and catheter, and no two catheter devices share common hardware. Therefore, a hospital normally needs a large storage room to house and maintain all types of medical equipment, including many catheter devices, and a lab or procedure room needs to be large enough to hold at least few devices and corresponding systems. In many hospitals, and in particular underdeveloped countries and areas, hospitals are usually tight of space and include numerous cables that may be on the floor or hung across the room, which may obstruct and/or hinder performing medical procedures and can be a trip hazard, and thus it would be advantageous to minimize number the number of cables used in a catheterization lab, hospital room, or other medical facilities, as well as minimize the amount of equipment needed to support all the different types of catheters.

An ICE catheter system that is small in size for better portability, and that it connects wirelessly to control console, display or displays and other peripheral equipment would be advantageous. Such an ICE catheter system can be moved/transported easily and when in-use occupies a minimum amount of space and requires few, if any, cables. The systems disclosed herein relate to a small high performance ICE ultrasound system. In an example, the ICE catheter system is a small brick-size ultrasound system with its single/primary modality being intracardiac echocardiography. Generally, in an embodiment where the control system is separate from the catheter handle, the control system can be disposed within a housing that is about, for example, 12"×10"×4". This system can include an internal data acquisition and processing circuitry that is specific to ICE in terms of channel count, electronic circuitry design and tuning, and onboard computation module(s) with software layers to implement ICE ultrasound image reconstruction. It will utilize a variety of other software application layers for data, control and metrology information between itself and a control console and to an electronic picture archiving and communication system (PACS)/electronic medical record (EMR) system.

ICE catheter systems in hospital rooms, such as the operating room, typically include an overhead display on which an image from a medical imaging device may be displayed in real time. The overhead display of the image may be referenced by a medical practitioner, such as a surgeon, who performs the procedure. Because the medical practitioner is preoccupied with performing said procedure, control of imaging parameters (e.g., contrast, brightness, depth level, and the like) may be difficult throughout the procedure. Even if the medical professional were able to simultaneously utilize an ICE catheter and control various imaging parameters, complicated control interfaces may impede efficiency and risk complications during procedures. Accordingly, it is advantageous to provide a remote ICE system in which imaging parameters may be controlled by easy to access and simplistic touch inputs on a remote control device. Such a system would allow a medical practitioner to control the output image from a medical imaging device, such as an ICE catheter, without looking at the laptop or tablet device. Alternatively, such a device would allow a technician located remotely from the imaging device, to control the output image received from the imaging device on display(s) for all present medical practitioners to reference.

Overview of ICE Ultrasound Remote System

FIG. 1 is a schematic illustrating an example embodiment of an ICE ultrasound remote system. In the illustrated example, ICE ultrasound system 100 includes an ICE catheter 102 that is configured to be coupled to a catheter handle 104, a control system 106 that is configured to be coupled to the catheter handle 104 and communicate with remote control device 108, and one or more display(s) 110.

Control system 106 may communicate with catheter handle 104 via a link cable 120. A distal end of the link cable 120 is configured to electrically and mechanically couple to the catheter handle 104. A proximal end of the link cable 120 is configured to electrically and mechanically couple to the control system 106. In some examples, the proximal end of the link cable 120 includes a male electrical connector and the control system 106 includes a corresponding female connector which the proximal end of the link cable 120 can be connected to. The link cable 120 can be electrically connected to the catheter handle 104 in various ways. In one example, the link cable 120 may be coupled to the catheter handle 104 via one or more contacts positioned around an opening on the proximal end of the handle 104. In another example, the link cable 120 may be electrically connected to the ICE catheter 102, to provide signals to the ICE catheter and to receive information from the ICE catheter, via an electrical interface on (e.g., inside) the catheter handle 104. For example, the distal end of the link cable 120 can be electrically connected to the ICE catheter 102 via an electrical interface on the inside distal end of the link cable 120.

The control system 106 includes modules and components assembled in a small chassis for easy storage and transportation. In this example, the control system 106 includes ICE ultrasound circuitry 112, a wireless module 114, a compute module 116, and a battery pack 118. The battery pack 118, which can be disposed in a compartment in the chassis, supplies power to run the control system 106, the catheter 102 and the catheter handle 104, and can supply power to other connected components. In some embodiments, other connected components have a different power source. The battery pack 118 may include a rechargeable battery set and a battery charger disposed in the chassis. In this way the control system 106 can be powered by AC from a wall outlet, or powered by the battery pack 118 when used a standalone system. When fully charged and running standalone, in some embodiments the battery pack 118 is sized for providing power to support the ICE ultrasound system 100 to operate for at least 4 hours, and more preferably more than 6 hours. In some embodiments, the battery pack 118 can also include non-rechargeable batteries. In various embodiments, the ICE ultrasound system 100 includes built-in AC power connection.

The wireless module 114 has electronics and software loaded thereon to connect the ICE ultrasound system 100 with a display or displays 110, a remote control device 108, which may be a laptop computer or a tablet computer, and potentially other peripheral accessories. The wireless communication may be based on a short-range wireless protocol, such as Bluetooth®, WiFi, or ZigBee®.

The computing (or "compute") module 116 includes microelectronics, for example, one or more of an application specific integrated circuit (ASIC), a central processing unit (CPU), a graphics processing unit (GPU), and/or a field-programmable gate array (FPGA), and other electrical components and software loaded on a memory chip or a hard drive to process image data and to send control commands to the ICE catheter 102 and/or the catheter handle 104. The ICE ultrasound circuitry 112, on the other hand, communicates data between the ICE catheter 102 and the computing module 116. When the ICE ultrasound circuitry 112 receives data from the ICE catheter 102, it may carry out some basic processing (e.g., data conversion) before communicating the data (or converted data) to the computing module 116. The computing module 116 then performs tasks (e.g., graphics processing, data analysis, etc.) and sends processed data to the remote control device 108 and the one or more displays (displays) 110. Upon reviewing displayed graphics and the data results on the remote control device 108 and/or the displays 110, the physician who operates the remote control device 108 makes a decision to send out commands from the remote control device 108 to perform certain functional actions at the ICE catheter 102 or to perform certain further data analysis.

The modules of the control system 106 shown in the example in FIG. 1 are assembled in a housing (or "chassis") that is sized to fit within a 15 inch×12 inch×6 inch volume or smaller, for example, about within a 12 inch×10 inch×4 inch volume. Such an ICE ultrasound system in a small chassis can be transported and carried around easily. Such a system can be stored on a shelf or in a cabinet in a storage room, needing only a small place for storing it. In addition, because of its size and weight, it can easily be installed in a lab or procedure room even for those hospitals with little available space. In some embodiments, if needed it can be stacked with other equipment. Furthermore, the wireless connection capability allows the control system 106 to connect to remote control device 108 and display(s) 110 located in various area of the room, and to connect to and share peripheral equipment, e.g., remote control device 108 and/or display(s) 110 with other devices in the room. As such, moving the control system 106 is usually not accompanied by moving peripheral equipment.

The modules of the control system 106, including the battery pack 118, the wireless module 114, the computing module 116, and the ICE ultrasound circuitry module 112, can be built into a plurality of printed circuit boards (PCBs) and electronic components assembled to the chassis, with connector(s) on a chassis wall to connect to the link cable 120. In other embodiments, the electronics of the computing module 116 and the wireless module 114 can be mounted on a mother PCB that is installed in the chassis, and the ICE ultrasound circuitry module 112 is then connected to the mother PCB as a child PCB. In this case, the ultrasound circuitry module 112 child PCB may have a connector, or two connectors built on it. When assembled, the connector (s) on the ultrasound circuitry module 112 child PCB is exposed through a wall on the chassis to connect to the link cable 120. In some embodiments, the components and the functionality of the of the control system 106 can be incorporated into a single PCB.

For optimal system performance, a combination of active and passive cooling methods is employed for thermal management. This may involve multiple sensors installed in the chassis of the control system 106 to monitor temperature to activate power delivery management and heat removal.

The ICE ultrasound circuitry module 112 shown in FIG. 1 supports intracardiac echocardiography (ICE). In some embodiments, a circuitry module can be configured to support other types of catheters, e.g., intravascular ultrasound (IVUS). As discussed above, the ICE ultrasound circuitry module 112 may be built as a child PCB adapted to be connected to the mother PCB that includes the computing module 116 and the wireless module 114. The remote control device 108 can be used to remotely control one or more functions or processes during an ICE session.

Remote control device 108 may be a laptop computer or a tablet computer, and potentially other peripheral accessories. Remote control device 108 may include a screen configured to display a graphical user interface (GUI). Remote control device 108 may also be configured to receive touch input from an operating user who may make decisions to send out commands from the remote control device 108 to perform certain functional actions at the ICE catheter 102 or to perform certain further data analysis. Remote control device may be coupled to control system 106 via a wired or wireless link.

Display(s) 110 may be any type of display configured to display a graphical user interface. Display(s) 110 may include overhead monitors mounted on the wall of a hospital room. The graphical user interface as shown on the remote control device 108 may be mirrored on display(s) 110 and updated in real-time on display(s) 110.

ICE Ultrasound Remote Control System—Detailed Description

Figure 2:
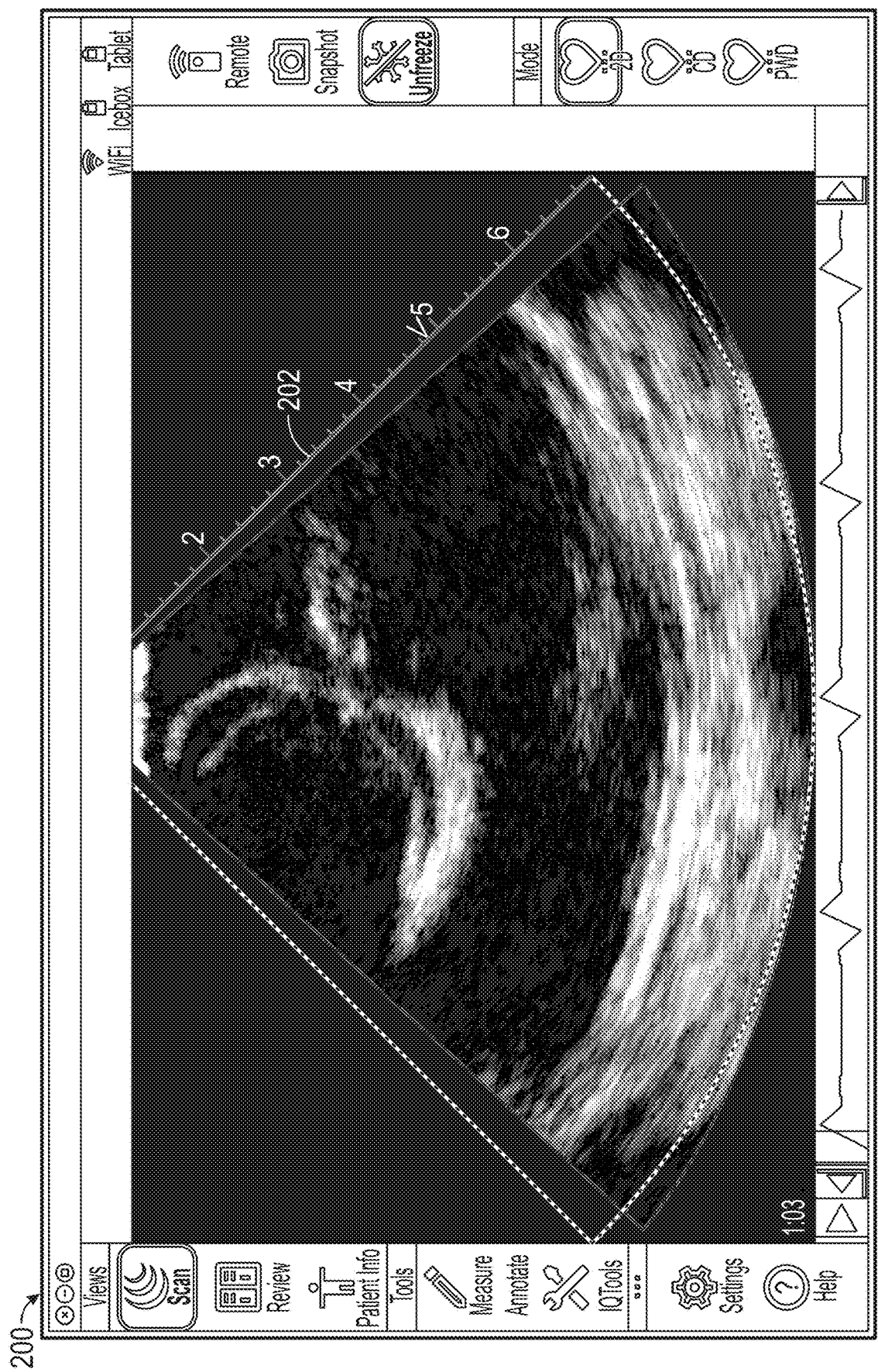
FIG. 2 illustrates an example of a graphical user interface that can be displayed in an ICE ultrasound remote control system.

FIG. 2 is an example of a graphical user interface (GUI) 200 that can be displayed in an ICE ultrasound remote control system. For example, the GUI 200 may be displayed on the remote control device 108 (FIG. 1). GUI 200 may also be mirrored on one or more displays 110 within the ICE ultrasound remote control system 100.

In the example illustrated in FIG. 2, GUI 200 includes a displayed medical image 202. Medical image 202 may include an ultrasonic image received from an ICE catheter, and/or other types of catheters. GUI 200 can include one or more icons along the sides of the image 202 and/or along the top/bottom of the image 202, where each icon is associated with certain functionality that is enable when the icon is selected. For example, as illustrated in FIG. 2, GUI 200 may include (along the left side of image 202 in this example) a list of Views that includes an icon associated with Scan (enabled in this example), Review, and Patient Info. Further as illustrated in FIG. 2, GUI 200 may include (along the left side of image 202 in this example) a list of Tools that may include Measure, Annotate, and IQ Tools. Also as illustrated in FIG. 2, GUI 200 may include (along the left side of image 202 in this example) a Settings icon (to control a variety of setting associated with the GUI and/or the procedure) and a Help icon. Also as illustrated in the example in FIG. 2, the GUI can include video play functionality, for example, positioned along the bottom of the GUI 200, that can include video control buttons (e.g., forward, reverse) for controlling the display of the displayed scan and graphically represent the location of the currently displayed image in the scan video. Also as shown in this example, the GUI 200 can include icons that represent connected systems or devices (e.g., WiFi, ICE control system, tablet), here displayed on the upper right-hand side of GUI 200. Also as shown in the example of FIG. 2, the GUI 200 can include icons along the right-hand side of the GUI 200 for various functionality, for example, to select a remote device, to take a snapshot of the displayed image, to freeze/unfreeze the displayed image, and to select from a list of modes (e.g., 2D, CD, or PWD).

In this example, GUI 200 is configured to display the medical image 202 without any superimposed controls or menu interfaces on the image 202. Also, in the illustrated example, GUI 200 is configured to display the medical image 202 without any cursor.

Figure 3:
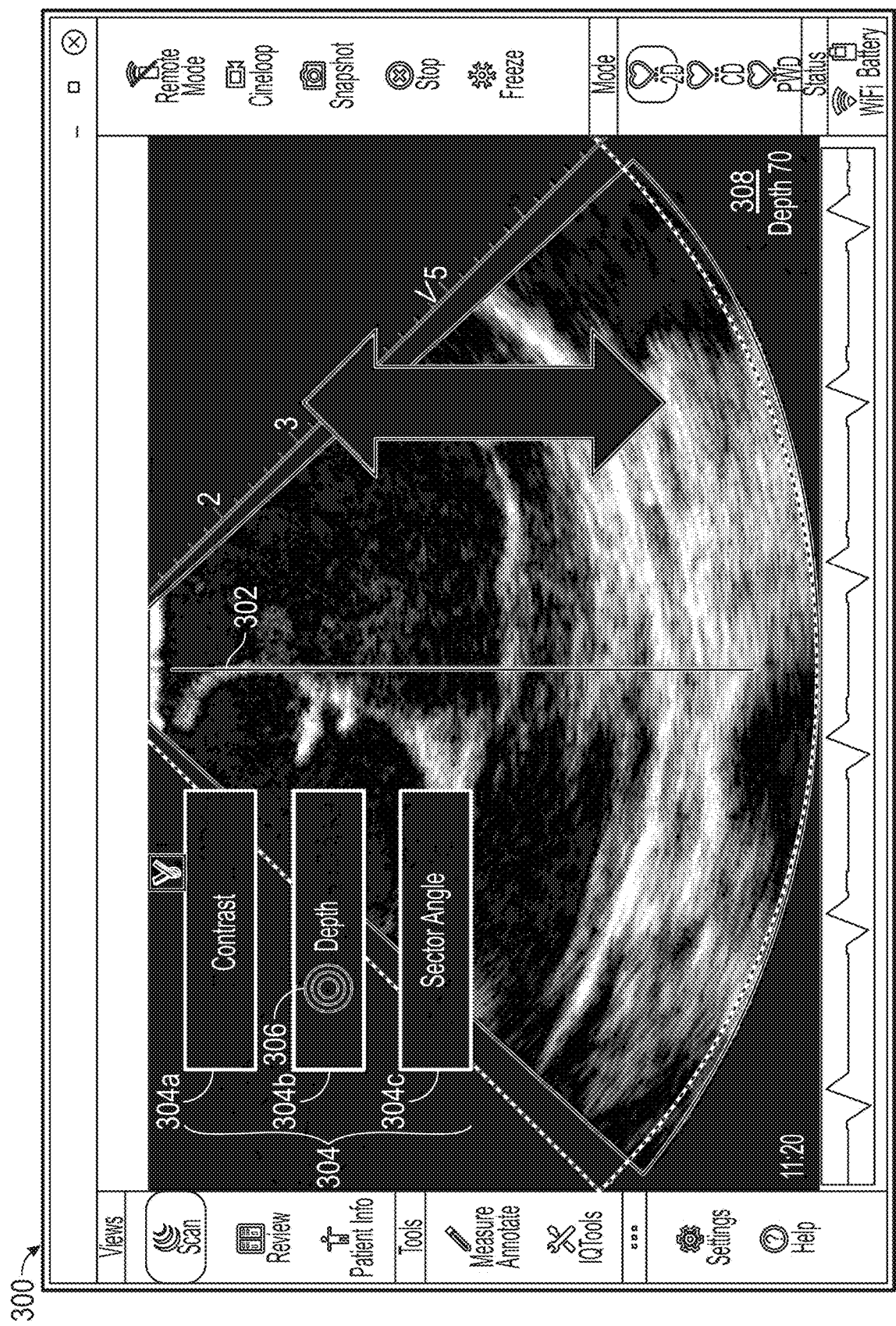
FIG. 3 illustrates an example of a graphical user interface that can be displayed in an ICE ultrasound remote control system for remotely selecting a control of a parameter.

FIG. 3 is an example of a graphical user interface that can be displayed in an ICE ultrasound remote control system for remotely selecting control of a parameter. In the illustrated example, GUI 200 is configured to display a remote control interactive menu 300 through which it can receive user inputs.

In the illustrated example in FIG. 3, remote control interactive menu 300 includes a dividing line 302, remote control buttons 304, and parameter value 308. In the illustrated example, remote control interactive menu 300 may be superimposed on the GUI 200 and medical image 202 upon an input by a user. In some embodiments, the input by a user may be a touch input. That is, the GUI 200 may be configured to display the remote control interactive menu 300 based on a touch input.

In the example of FIG. 3, dividing line 302 divides the remote control interactive menu 300 and GUI 200 into a first side and a second side. In some embodiments (and as illustrated in FIG. 3), remote control interactive menu 300 and GUI 200 may be divided by dividing line 302 into a left side and a right side.

In this example, remote control buttons 304, including 304a-304c, are displayed on the left side of the remote control interactive menu 300. It will be understood that the remote control interactive menu 300 may be configured for both right and left hand users. Accordingly, in some embodiments, the remote control buttons 304 may be displayed on the right hand side of the remote control interactive menu 300. Each remote control button 304 may correspond to a parameter. In the illustrated example, text (or a symbol) specifying the corresponding parameter is included on the remote control button 304. In some embodiments, parameters may include depth level, sector angle, contrast, TGC, zoom level, pan location, mode, doppler box size, doppler box location, freeze/unfreeze, and pause/play. In some embodiments, the mode parameter corresponds to switching between B-mode and doppler mode. In some embodiments, any parameter controllable by the catheter handle 104 may be controlled by remote control device 108.

In some embodiments, selection of a remote control button 304 may correspond to the control of any one of the parameters. In some embodiments, unlike traditional GUI buttons, selection of a remote control button 304 may be based on the location where the touch input loses contact with the screen of the remote control device 108. In the illustrated example, the selected control button 304b is highlighted upon selection as indicated by a thicker border of the remote control button 304b.

In this example, GUI 200 is configured to display a cursor 306 corresponding to the input by a user. In this example, cursor 306 includes concentric circles, wherein the center of the circles indicates an input location. Other embodiments may display other symbols indicative of the cursor 306 location.

In the illustrated example, the parameter value 308 is displayed on the GUI 200. In this example, parameter value 308 includes the text specifying the corresponding parameter (e.g., contrast, depth, sector angle) and a current value of the selected parameter.

In some embodiments, the remote control interactive menu 300 is configured to be removed from the GUI 200 upon a touch input losing contact with the screen of the remote control device 108.

Figure 4:
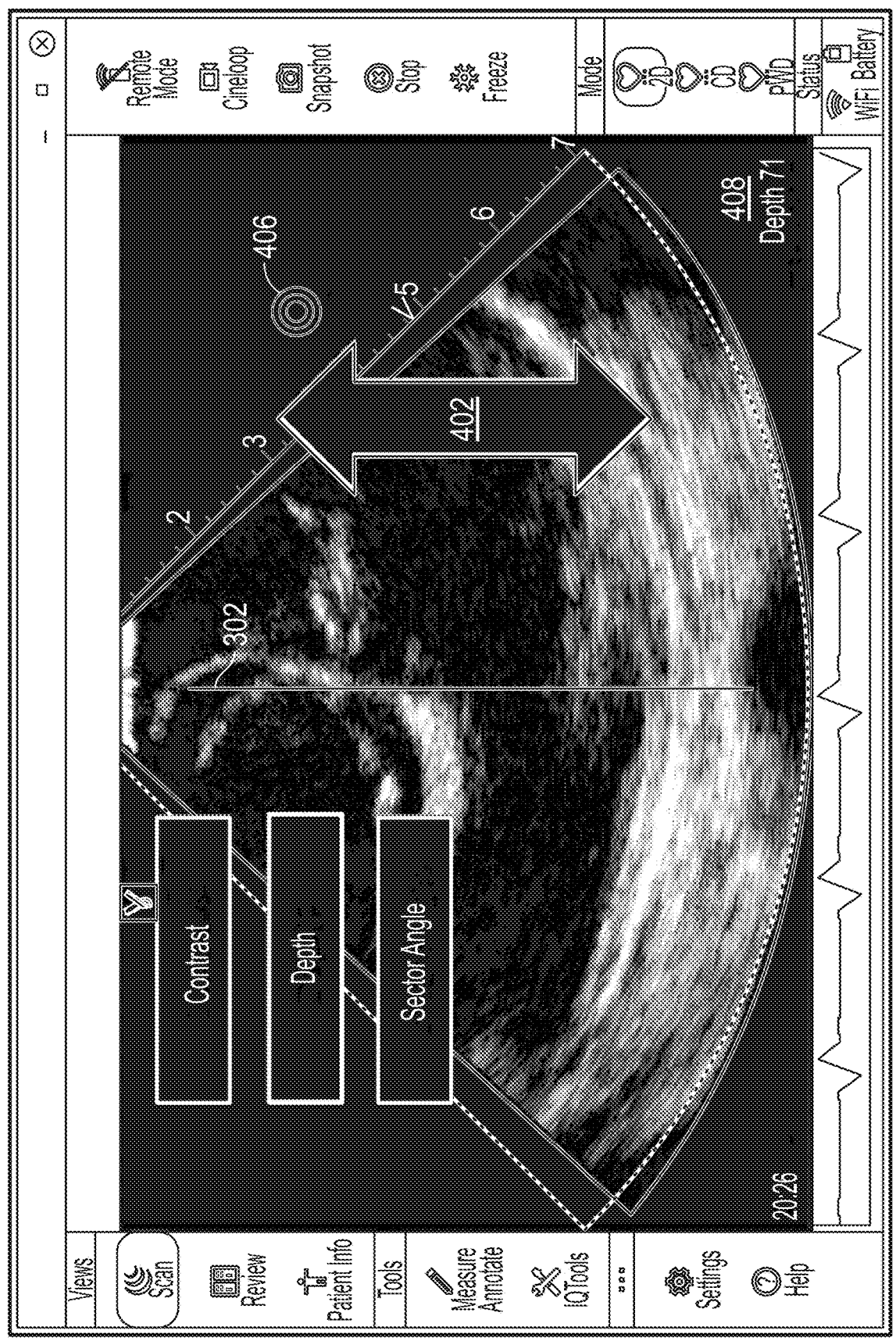
FIG. 4 illustrates an example of a graphical user interface that can be displayed in an ICE ultrasound remote control system for remotely adjusting a parameter.

FIG. 4 is an example of a graphical user interface that can be displayed in an ICE ultrasound remote control system for remotely adjusting a parameter.

With reference to FIG. 3, dividing line 302 is configured to divide the remote control interactive menu 300 and GUI 200 into one side (e.g., a first side) and another side (e.g., a second side). In some embodiments, remote control interactive menu 300 and GUI 200 may be divided by dividing line 302 into a left side and a right side. In other embodiments, the GUI 200 is configured to be divided by a dividing line into a upper portion and a lower portion relative to the displayed aspect of the GUI.

In the illustrated example, the arrow icon 402 is displayed on the right side of the remote control interactive menu 300. It will be understood that the remote control interactive menu 300 may be configured for both right and left hand users. Accordingly, in some embodiments, the arrow icon 402 may be displayed on the left side of the remote control interactive menu 300.

Arrow icon 402 may have two or more arrow heads depending on the selected parameter. For example, for parameters with a single value, the arrow icon may have two heads oriented vertically. For parameters with two values, the arrow icon may have four arrow heads. In the illustrated example, selected parameter "Depth" has a single value, thus arrow icon 402 has two arrow heads.

In some embodiments, adjustment of a parameter may be accomplished by touching and dragging anywhere on the right hand side of the GUI 200. As noted above, it will be understood that the remote control interactive menu 300 may be configured for both right and left hand users. Accordingly, in some embodiments, adjustment of the parameter may be accomplished by touching and dragging anywhere on the left hand side of the GUI 200. For example, a user may touch at symbol 406 and drag the touch input in a "vertical" direction upward to decrease the imaging depth or drag the touch input in a "vertical" direction downward to decrease the imaging depth. In some embodiments, adjustment of the parameter is based on the direction of the dragging of the touch input. For example, given a parameter with two values, dragging vertically may adjust one value and dragging horizontally may adjust a second value.

Adjustment of the selected parameter may correspond to an updated medical image 202 shown on GUI 200. For example, adjustment of a contrast parameter may result in an updated medical image with a higher contrast displayed on the GUI.

In the illustrated value, the parameter value 408 (in this example "depth") may also be displayed on the GUI 200 corresponding to the adjusted parameter value (compare to FIG. 3). In the illustrated example, parameter value 408 includes the text specifying the corresponding parameter (e.g., contrast, depth, sector angle) and a current value of the selected parameter.

Illustrative Embodiment

Figure 5:
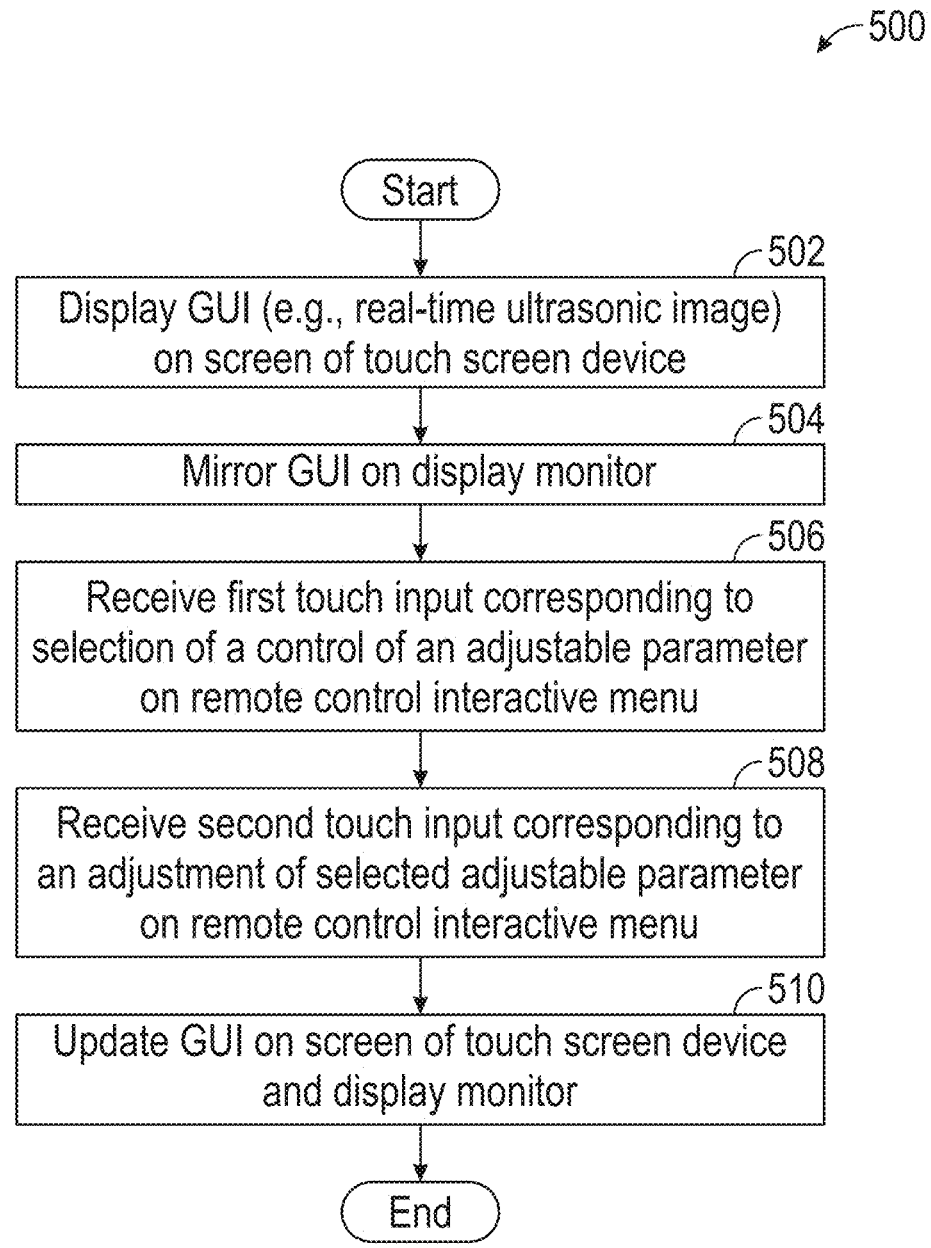
FIG. 5 is a block diagram depicting an embodiment of a graphical user interface that can be displayed in an ICE ultrasound remote control system.

FIG. 5 illustrates a block diagram depicting an example embodiment(s) of systems, methods, and devices for an ICE ultrasound remote control system, as shown by routine 500.

In some embodiments, at block 502, the ICE ultrasound remote control system may include displaying a graphical user interface (GUI) on a screen of a remote control device 108 coupled to an ICE ultrasonic handheld device, the GUI containing a real-time ultrasonic image. In some embodiments, the system may be configured for remotely controlling a medical imaging system, in which the GUI contains a real-time medical image.

In some embodiments, at block 504, the ICE ultrasound remote control system may include mirroring the GUI in real time on a display monitor separate from the remote control device.

In some embodiments, at block 506, the ICE ultrasound remote control system may include receiving a first touch input on the screen of the remote control device and displaying a remote control interactive menu overlaid on the ultrasonic image, wherein the first touch input corresponds to a selection of a control of a parameter. In some embodiments, the remote control interface menu is divided into one side and another side. In some embodiments, the one side comprises buttons corresponding to a control of the parameter. In some embodiments, the other side comprises an icon with two or more arrow heads. In some embodiments, the remote control interface menu comprises a value of the selected parameter. In some embodiments, selection of the parameter is based on a location where the first touch input loses contact with the screen. In some embodiments, the ICE ultrasound remote control system may include displaying a cursor corresponding to the location of the first touch input. In some embodiments, the parameter comprises one or more of depth level, sector angle, contrast, TGC, zoom level, pan location, mode, doppler box size, doppler box location, freeze/unfreeze, and pause/play.

In some embodiments, at block 508, the ICE ultrasound remote control system may include receiving a second touch input on the screen of the remote control device and displaying the remote control interactive menu, wherein the second touch input corresponds to an adjustment of the selected parameter. In some embodiments, the second touch input comprises dragging in a horizontal or vertical direction. In some embodiments, adjustment of the parameter is based on the direction of the dragging of the second touch input. In some embodiments, the ICE ultrasound remote control system may include displaying a cursor corresponding to the location of the second touch input. In some embodiments, the ICE ultrasound remote control system may include removing the remote control interactive menu upon the touch input losing contact with the screen.

In some embodiments, at block 510, the ICE ultrasound remote control system may include updating the ultrasonic image on the remote control device and display monitor according to the selected and adjusted remote control parameter.

Figure 6:
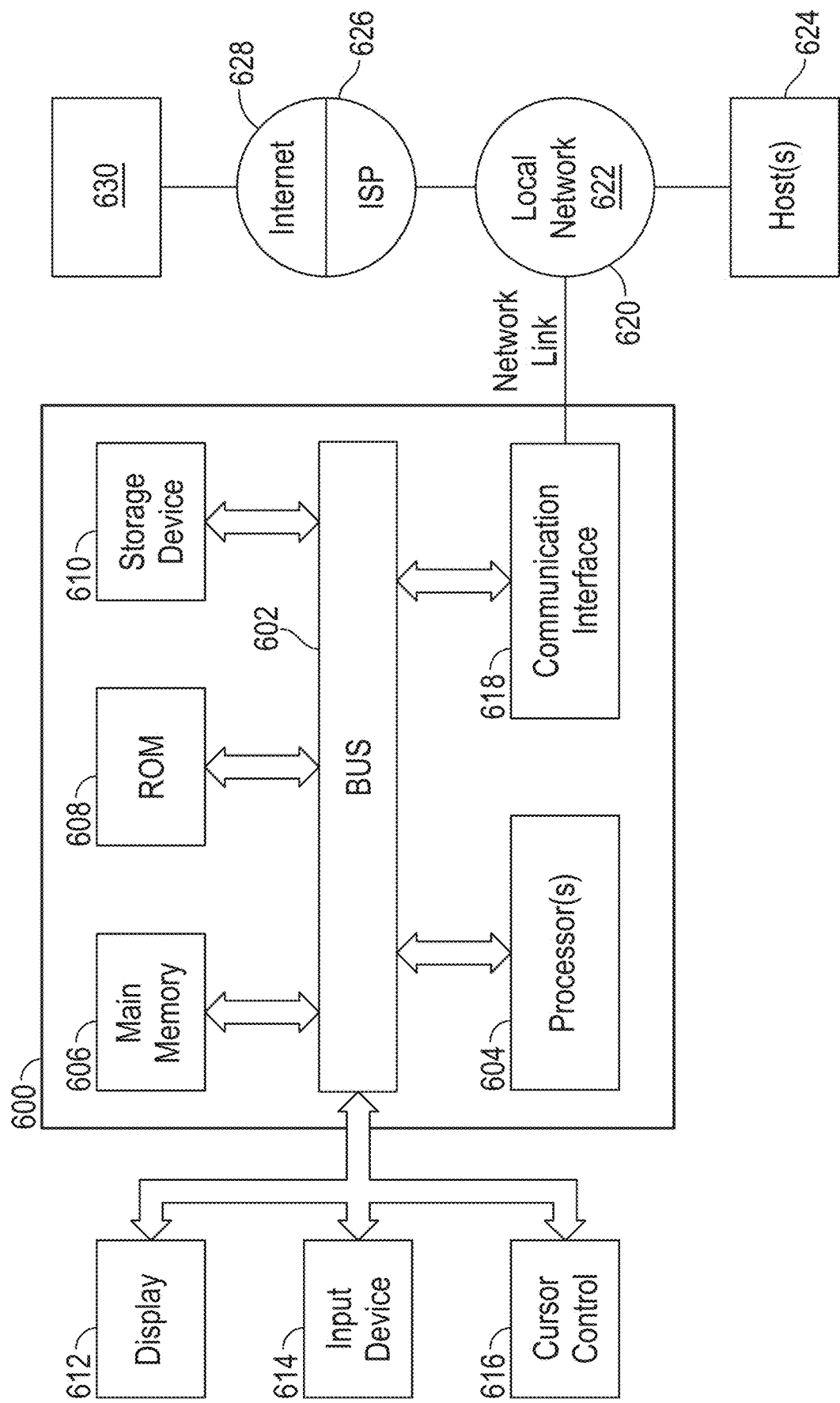
FIG. 6 is a block diagram that illustrates a computer system that may be used in some embodiments of this disclosure.

FIG. 6 is a block diagram that illustrates a computer system 600 with which certain methods discussed herein may be implemented. Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random-access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. The main memory 606 may, for example, include instructions to implement a user interface as illustrated in FIGS. 2-4, calculate data metrics, allow a user to filter data and change data in data sets, and store information indicting the operations performed to clean and/or prepare data to a log the data being stored in some examples in data objects as defined by an ontology.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 may be coupled via bus 602 to a display 612, such as a cathode ray tube (CRT) or LCD display (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as computer executable program instructions that are executed by the computing device(s). Computer system 600 may further, as described below, implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more computer readable program instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

Various forms of computer readable storage media may be involved in carrying one or more sequences of one or more computer readable program instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 818 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicate with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Implementation on a Computer System

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid-state drive) either before or after execution by the computer processor.

The flowchart and block diagrams in the Figures illustrate the architecture, functionality, and operation of implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide user interface functionality, such as a graphical user interface ("GUI"), among other things.

IMPLEMENTATION CONSIDERATIONS

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Headings are included herein for reference and to aid in locating various sections. These headings are not intended to limit the scope of the concepts described with respect thereto. Such concepts may have applicability throughout the entire specification.

Many variations and modifications may be made to the above-described embodiments, the elements of which are to be understood as being among other acceptable examples.

All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

It will also be understood that, when a feature or element (for example, a structural feature or element) is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present. Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward," "rearward," "under," "below," "lower," "over," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

EXAMPLES OF CERTAIN EMBODIMENTS

Embodiment 1. A method for remotely controlling an ICE ultrasound system, the method comprising: displaying a graphical user interface (GUI) on a screen of a remote control device coupled to an ICE ultrasonic handheld device, the GUI containing a real-time ultrasonic image; mirroring the GUI in real time on a display monitor separate from the remote control device; receiving a first touch input on the screen of the remote control device and displaying a remote control interactive menu overlaid on the ultrasonic image, wherein the first touch input corresponds to a selection of a control of a parameter, receiving a second touch input on the screen of the remote control device and displaying the remote control interactive menu, wherein the second touch input corresponds to an adjustment of the selected parameter, updating the ultrasonic image on the remote control device and display monitor according to the selected and adjusted remote control parameter, wherein the system comprises a computer processor and an electronic storage medium.

Embodiment 2. The method of embodiment 1, wherein the remote control interface menu is divided into one side and another side.

Embodiment 3. The method of embodiment 2, wherein the one side—comprises buttons corresponding to a control of the parameter.

Embodiment 4. The method of embodiment 2, wherein the other side comprises an icon with two or more arrow heads.

Embodiment 5. The method of embodiment 1, wherein the remote control interface menu comprises a value of the selected parameter.

Embodiment 6. The method of embodiment 1, wherein the selection of the parameter is based on a location where the first touch input loses contact with the screen.

Embodiment 7. The method of embodiment 1, wherein the second touch input comprises dragging in a horizontal or vertical direction.

Embodiment 8. The method of embodiment 7, wherein adjustment of the parameter is based on the direction of the dragging of the second touch input.

Embodiment 9. The method of embodiment 1, further comprising: displaying a cursor corresponding to the location of the first touch input.

Embodiment 10. The method of embodiment 1, further comprising: displaying a cursor corresponding to the location of the second touch input.

Embodiment 11. The method of embodiment 1, further comprising: removing the remote control interactive menu upon the touch input losing contact with the screen.

Embodiment 12. The method of embodiment 1, wherein the parameter comprises one or more of depth level, sector angle, contrast, TGC, zoom level, pan location, mode, doppler box size, doppler box location, freeze/unfreeze, and pause/play.

Embodiment 13. A system comprising: an ICE ultrasonic handheld device; a remote control device; a display monitor; a control system coupled to the remote control device and the display monitor, with a non-transitory computer storage medium configured to at least store computer-executable instructions; and one or more computer hardware processors in communication with the non-transitory computer storage medium, the one or more computer hardware processors configured to execute the computer-executable instructions to at least: display a graphical user interface (GUI) on a screen of the remote control device, the GUI containing a real-time ultrasonic image; mirror the GUI in real time on the display monitor; receive a first touch input on the screen of the remote control device and display a remote control interactive menu overlaid on the ultrasonic image, wherein the first touch input corresponds to a selection of a control of a parameter, receive a second touch input on the screen of the remote control device and display the remote control interactive menu, wherein the second touch input corresponds to an adjustment of the selected parameter, update the ultrasonic image on the remote control device and display monitor according to the selected and adjusted remote control parameter.

Embodiment 14. The system of embodiment 13, wherein the remote control interface menu is divided into one side and another side.

Embodiment 15. The system of embodiment 14, wherein the one side—comprises buttons corresponding to a control of the parameter.

Embodiment 16. The system of embodiment 13, wherein the other side comprises an icon with two or more arrow heads.

Embodiment 17. The system of embodiment 13, wherein the remote control interface menu comprises a value of the selected parameter.

Embodiment 18. The system of embodiment 13, wherein the selection of the parameter is based on a location where the first touch input loses contact with the screen.

Embodiment 19. The system of embodiment 13, wherein the second touch input comprises dragging in a horizontal or vertical direction.

Embodiment 20. The system of embodiment 19, wherein adjustment of the parameter is based on the direction of the dragging of the second touch input.

Embodiment 21. The system of embodiment 13, wherein the one or more hardware processors are further configured to display a cursor corresponding to the location of the first touch input.

Embodiment 22. The system of embodiment 13, wherein the one or more hardware processors are further configured to: display a cursor corresponding to the location of the second touch input.

Embodiment 23. The system of embodiment 13, wherein the one or more hardware processors are further configured to: remove the remote control interactive menu upon the touch input losing contact with the screen.

Embodiment 24. The system of embodiment 13, wherein the parameter comprises one or more of depth level, sector angle, contrast, TGC, zoom level, pan location, mode, doppler box size, doppler box location, freeze/unfreeze, and pause/play.

Embodiment 25. A non-transitory computer readable medium configured for remotely controlling an ICE ultrasound system, the computer readable medium having program instructions for causing a hardware processor to perform a method of: displaying a graphical user interface (GUI) on a screen of a remote control device coupled to an ICE ultrasonic handheld device, the GUI containing a real-time ultrasonic image; mirroring the GUI in real time on a display monitor separate from the remote control device; receiving a first touch input on the screen of the remote control device and displaying a remote control interactive menu overlaid on the ultrasonic image, wherein the first touch input corresponds to a selection of a control of a parameter, receiving a second touch input on the screen of remote control device and displaying the remote control interactive menu, wherein the second touch input corresponds to an adjustment of the selected parameter, updating the ultrasonic image on the remote control device and display monitor according to the selected and adjusted remote control parameter.

Embodiment 26. The non-transitory computer readable medium of embodiment 25, wherein the remote control interface menu is divided into one side and another side.

Embodiment 27. The non-transitory computer readable medium of embodiment 26, wherein the one side comprises buttons corresponding to a control of the parameter.

Embodiment 28. The non-transitory computer readable medium of embodiment 26, wherein the other side comprises an icon with two or more arrow heads.

Embodiment 29. The non-transitory computer readable medium of embodiment 25, wherein the remote control interface menu comprises a value of the selected parameter.

Embodiment 30. The non-transitory computer readable medium of embodiment 25, wherein the selection of the parameter is based on a location where the first touch input loses contact with the screen.

Embodiment 31. The non-transitory computer readable medium of embodiment 25, wherein the second touch input comprises dragging in a horizontal or vertical direction.

Embodiment 32. The non-transitory computer readable medium of embodiment 31, wherein adjustment of the parameter is based on the direction of the dragging of the second touch input.

Embodiment 33. The non-transitory computer readable medium of embodiment 25, wherein the method performed by the hardware processor further comprises: displaying a cursor corresponding to the location of the first touch input.

Embodiment 34. The non-transitory computer readable medium of embodiment 25, wherein the method performed by the hardware processor further comprises: displaying a cursor corresponding to the location of the second touch input.

Embodiment 35. The non-transitory computer readable medium of embodiment 25, wherein the method performed by the hardware processor further comprises: removing the remote control interactive menu upon the touch input losing contact with the screen.

Embodiment 36. The non-transitory computer readable medium of embodiment 25, wherein the parameter comprises one or more of depth level, sector angle, contrast, TGC, zoom level, pan location, mode, doppler box size, doppler box location, freeze/unfreeze, and pause/play.

Embodiment 37. A method for remotely controlling a medical imaging system, the method comprising: displaying a graphical user interface (GUI) on a screen of a remote control device coupled to an imaging device, the GUI containing a real-time medical image; mirroring the GUI in real time on a display monitor separate from the remote control device; receiving a first touch input on the screen of the remote control device and displaying a remote control interactive menu overlaid on the medical image, wherein the first touch input corresponds to a selection of a control of a parameter, receiving a second touch input on the screen of the remote control device and displaying the remote control interactive menu, wherein the second touch input corresponds to an adjustment of the selected parameter, updating the medical image on the remote control device and display monitor according to the selected and adjusted remote control parameter, wherein the system comprises a computer processor and an electronic storage medium.

Embodiment 38. The method of embodiment 37, wherein the remote control interface menu is divided into one side and another side.

Embodiment 39. The method of embodiment 38, wherein the one side—comprises buttons corresponding to a control of the parameter.

Embodiment 40. The method of embodiment 38, wherein the other side comprises an icon with two or more arrow heads.

Embodiment 41. The method of embodiment 37, wherein the remote control interface menu comprises a value of the selected parameter.

Embodiment 42. The method of embodiment 37, wherein the selection of the parameter is based on a location where the first touch input loses contact with the screen.

Embodiment 43. The method of embodiment 37, wherein the second touch input comprises dragging in a horizontal or vertical direction.

Embodiment 44. The method of embodiment 43, wherein adjustment of the parameter is based on the direction of the dragging of the second touch input.

Embodiment 45. The method of embodiment 37, further comprising: Displaying a cursor corresponding to the location of the first touch input.

Embodiment 46. The method of embodiment 37, further comprising: displaying a cursor corresponding to the location of the second touch input.

Embodiment 47. The method of embodiment 37, further comprising: removing the remote control interactive menu upon the touch input losing contact with the screen.

Embodiment 48. The method of embodiment 37, wherein the parameter comprises one or more of depth level, sector angle, contrast, TGC, zoom level, pan location, mode, doppler box size, doppler box location, freeze/unfreeze, and pause/play.

Embodiment 49. A system comprising: an imaging device; a remote control device; a display monitor; a control system coupled to the remote control device and the display monitor, with a non-transitory computer storage medium configured to at least store computer-executable instructions; and one or more computer hardware processors in communication with the non-transitory computer storage medium, the one or more computer hardware processors configured to execute the computer-executable instructions to at least: display a graphical user interface (GUI) on a screen of the remote control device, the GUI containing a real-time medical image; mirror the GUI in real time on the display monitor; receive a first touch input on the screen of the remote control device and display a remote control interactive menu overlaid on the medical image, wherein the first touch input corresponds to a selection of a control of a parameter, receive a second touch input on the screen of the remote control device and display the remote control interactive menu, wherein the second touch input corresponds to an adjustment of the selected parameter, update the medical image on the remote control device and display monitor according to the selected and adjusted remote control parameter.

Embodiment 50. The system of embodiment 49, wherein the remote control interface menu is divided into one side and another side.

Embodiment 51. The system of embodiment 50, wherein the one side—comprises buttons corresponding to a control of the parameter.

Embodiment 52. The system of embodiment 50, wherein the other side comprises an icon with two or more arrow heads.

Embodiment 53. The system of embodiment 49, wherein the remote control interface menu comprises a value of the selected parameter.

Embodiment 54. The system of embodiment 49, wherein the selection of the parameter is based on a location where the first touch input loses contact with the screen.

Embodiment 55. The system of embodiment 49, wherein the second touch input comprises dragging in a horizontal or vertical direction.

Embodiment 56. The system of embodiment 55 wherein adjustment of the parameter is based on the direction of the dragging of the second touch input.

Embodiment 57. The system of embodiment 49, wherein the one or more hardware processors are further configured to display a cursor corresponding to the location of the first touch input.

Embodiment 58. The system of embodiment 49, wherein the one or more hardware processors are further configured to: display a cursor corresponding to the location of the second touch input.

Embodiment 59. The system of embodiment 49, wherein the one or more hardware processors are further configured to: remove the remote control interactive menu upon the touch input losing contact with the screen.

Embodiment 60. The system of embodiment 49, wherein the parameter comprises one or more of depth level, sector angle, contrast, TGC, zoom level, pan location, mode, doppler box size, doppler box location, freeze/unfreeze, and pause/play.

Embodiment 61. A non-transitory computer readable medium configured for remotely controlling a medical imaging system, the computer readable medium having program instructions for causing a hardware processor to perform a method of: displaying a graphical user interface (GUI) on a screen of a remote control device coupled to an imaging device, the GUI containing a real-time medical image; mirroring the GUI in real time on a display monitor separate from the remote control device; receiving a first touch input on the screen of the remote control device and displaying a remote control interactive menu overlaid on the medical image, wherein the first touch input corresponds to a selection of a control of a parameter, receiving a second touch input on the screen of the remote control device and displaying the remote control interactive menu, wherein the second touch input corresponds to an adjustment of the selected parameter, updating the medical image on the remote control device and display monitor according to the selected and adjusted remote control parameter.

Embodiment 62. The non-transitory computer readable medium of embodiment 61, wherein the remote control interface menu is divided into one side and another side.

Embodiment 63. The non-transitory computer readable medium of embodiment 62, wherein the one side comprises buttons corresponding to a control of the parameter.

Embodiment 64. The non-transitory computer readable medium of embodiment 62, wherein the other side comprises an icon with two or more arrow heads.

Embodiment 65. The non-transitory computer readable medium of embodiment 61, wherein the remote control interface menu comprises a value of the selected parameter.

Embodiment 66. The non-transitory computer readable medium of embodiment 61, wherein the selection of the parameter is based on a location where the first touch input loses contact with the screen.

Embodiment 67. The non-transitory computer readable medium of embodiment 61, wherein the second touch input comprises dragging in a horizontal or vertical direction.

Embodiment 68. The non-transitory computer readable medium of embodiment 67, wherein adjustment of the parameter is based on the direction of the dragging of the second touch input.

Embodiment 69. The non-transitory computer readable medium of embodiment 61, wherein the method performed by the hardware processor further comprises: displaying a cursor corresponding to the location of the first touch input.

Embodiment 70. The non-transitory computer readable medium of embodiment 61, wherein the method performed by the hardware processor further comprises: displaying a cursor corresponding to the location of the second touch input.

Embodiment 71. The non-transitory computer readable medium of embodiment 61, wherein the method performed by the hardware processor further comprises: removing the remote control interactive menu upon the touch input losing contact with the screen.

Embodiment 72. The non-transitory computer readable medium of embodiment 61, wherein the parameter comprises one or more of depth level, sector angle, contrast, TGC, zoom level, pan location, mode, doppler box size, doppler box location, freeze/unfreeze, and pause/play.

What is claimed is:

1. A method for remotely controlling an ICE ultrasound system, the method comprising:
   displaying a graphical user interface (GUI) on a screen of a remote control device coupled to an ICE ultrasonic handheld device, the GUI containing a real-time ultrasonic image;
   mirroring the GUI in real time on a display monitor separate from the remote control device;

receiving a first touch input on the screen of the remote control device and displaying a remote control interactive menu overlaid on the ultrasonic image, wherein the first touch input corresponds to a selection of a control of a parameter, receiving a second touch input on the screen of the remote control device and displaying the remote control interactive menu, wherein the second touch input corresponds to an adjustment of the selected parameter, updating the ultrasonic image on the remote control device and display monitor according to the selected and adjusted remote control parameter, wherein the system comprises a computer processor and an electronic storage medium.

2. The method of claim 1, wherein the remote control interface menu is divided into one side and another side.

3. The method of claim 2, wherein the one side comprises buttons corresponding to a control of the parameter.

4. The method of claim 2, wherein the other side comprises an icon with two or more arrow heads.

5. The method of claim 1, wherein the remote control interface menu comprises a value of the selected parameter.

6. The method of claim 1, wherein the selection of the parameter is based on a location where the first touch input loses contact with the screen.

7. The method of claim 1, wherein the second touch input comprises dragging in a horizontal or vertical direction.

8. The method of claim 7, wherein adjustment of the parameter is based on the direction of the dragging of the second touch input.

9. The method of claim 1, wherein the parameter comprises one or more of depth level, sector angle, contrast, TGC, zoom level, pan location, mode, doppler box size, doppler box location, freeze/unfreeze, and pause/play.

10. A system comprising:
an ICE ultrasonic handheld device;
a remote control device;
a display monitor;
a control system coupled to the remote control device and the display monitor, with a non-transitory computer storage medium configured to at least store computer-executable instructions; and
one or more computer hardware processors in communication with the non-transitory computer storage medium, the one or more computer hardware processors configured to execute the computer-executable instructions to at least:
display a graphical user interface (GUI) on a screen of the remote control device, the GUI containing a real-time ultrasonic image;
mirror the GUI in real time on the display monitor;
receive a first touch input on the screen of the remote control device and display a remote control interactive menu overlaid on the ultrasonic image, wherein the first touch input corresponds to a selection of a control of a parameter,
receive a second touch input on the screen of the remote control device and display the remote control interactive menu, wherein the second touch input corresponds to an adjustment of the selected parameter,
update the ultrasonic image on the remote control device and display monitor according to the selected and adjusted remote control parameter.

11. The system of claim 10, wherein the selection of the parameter is based on a location where the first touch input loses contact with the screen.

12. The system of claim 10, wherein the second touch input comprises dragging in a horizontal or vertical direction.

13. The system of claim 12, wherein adjustment of the parameter is based on the direction of the dragging of the second touch input.

14. The system of claim 10, wherein the parameter comprises one or more of depth level, sector angle, contrast, TGC, zoom level, pan location, mode, doppler box size, doppler box location, freeze/unfreeze, and pause/play.

15. A non-transitory computer readable medium configured for remotely controlling an ICE ultrasound system, the computer readable medium having program instructions for causing a hardware processor to perform a method of:
displaying a graphical user interface (GUI) on a screen of a remote control device coupled to an ICE ultrasonic handheld device, the GUI containing a real-time ultrasonic image;
mirroring the GUI in real time on a display monitor separate from the remote control device;
receiving a first touch input on the screen of the remote control device and displaying a remote control interactive menu overlaid on the ultrasonic image, wherein the first touch input corresponds to a selection of a control of a parameter,
receiving a second touch input on the screen of remote control device and displaying the remote control interactive menu, wherein the second touch input corresponds to an adjustment of the selected parameter,
updating the ultrasonic image on the remote control device and display monitor according to the selected and adjusted remote control parameter.

16. The non-transitory computer readable medium of claim 15, wherein the selection of the parameter is based on a location where the first touch input loses contact with the screen.

17. The non-transitory computer readable medium of claim 15, wherein the second touch input comprises dragging in a horizontal or vertical direction.

18. The non-transitory computer readable medium of claim 17, wherein adjustment of the parameter is based on the direction of the dragging of the second touch input.

19. The non-transitory computer readable medium of claim 15, wherein the method performed by the hardware processor further comprises:
removing the remote control interactive menu upon the touch input losing contact with the screen.

20. The non-transitory computer readable medium of claim 15, wherein the parameter comprises one or more of depth level, sector angle, contrast, TGC, zoom level, pan location, mode, doppler box size, doppler box location, freeze/unfreeze, and pause/play.

* * * * *